UNITED STATES PATENT OFFICE.

OSCAR BALLY, OF MANNHEIM, GERMANY, ASSIGNOR TO THE BADISCHE ANILIN AND SODA FABRIK, OF LUDWIGSHAFEN, GERMANY.

VIOLET-RED DYE AND PROCESS OF MAKING SAME.

SPECIFICATION forming part of Letters Patent No. 659,565, dated October 9, 1900.

Application filed June 24, 1899. Serial No. 721,761. (Specimens.)

*To all whom it may concern:*

Be it known that I, OSCAR BALLY, doctor of philosophy, a citizen of the Swiss Republic, residing at Mannheim, in the Grand Duchy of Baden and Empire of Germany, have invented new and useful Improvements in the Manufacture of Violet-Red Coloring-Matter for Wool, (for which applications have been filed in Germany, dated December 9, 1898, No. B.23,887; in England, dated April 11, 1899, No. 7,591, and in France, dated May 4, 1899, No. 276,452,) of which the following is a specification.

It is known that if 1.5-di-ortho-nitro-anthraquinone be boiled with anilin a product is obtained which crystallizes in deep-red needles and dissolves in hot alcohol, giving purple solutions. This was first described by Böttger and Petersen in 1873. (See *Berichte of the German Chemical Society*, Vol. 6, p. 16.) Ten years later, in 1883, the body was more accurately described by Römer. (See *Berichte of the German Chemical Society*, Vol. 16, p. 363.) This body is intensely colored. It dissolves in such solvents as glacial acetic acid, benzene, and the like, yielding intensely-red solutions; but it possesses no affinity for textile fibers and cannot be regarded as a dyestuff in a practical sense, and no means of converting it into a useful product has been described. Analogous bodies can be obtained if the dinitro-anthraquinone be treated with other aromatic amins instead of with anilin, and the bodies so obtained I term "di-alphyl-diamido-anthraquinone." In United States Letters Patent Nos. 631,605 and 631,606, of August 22, 1899, I have already described the utilization of these bodies for the production of halogen derivatives and of coloring-matters of the anthracene series.

My present invention relates to the manufacture of wool-coloring matters of the said di-alphyl-diamido-anthraquinone by sulfonation.

Different results are obtained, according to whether the sulfonation be conducted energetically or moderately. Upon moderate sulfonation with concentrated sulfuric acid at a temperature not exceeding 100° a coloring-matter is obtained which is readily soluble in hot water, but can be readily precipitated from its solution by common salt. The shades obtained upon wool with coloring-matter obtained in this way are violet-red in color; but if the di-alphyl-diamido-anthraquinone be energetically sulfonated, say, with fuming sulfuric acid containing twenty per cent. free anhydride a coloring-matter is obtained which is soluble in hot or cold water and cannot readily be precipitated from its solution with common salt or potassium chlorid. Such coloring-matter dies wool, yielding yellowish shades of red.

In the present application for Letters Patent I desire to claim the violet-red coloring-matters referred to generically, and specifically the violet-red coloring-matter which can be obtained from di-anilido-anthraquinone, and do not claim the yellow-red coloring-matters which constitute the subject-matter of an application, Serial No. 721,762, of even date herewith.

The following example will serve to illustrate the manner in which my invention can be carried into practical effect:

Example: Mix together one hundred (100) parts of 1.5-di-anilido-anthraquinone—that is to say, the condensation product obtained from 1.4'-di-ortho-nitro-anthraquinone and anilin—and one thousand (1,000) parts of concentrated sulfuric acid, (containing about ninety-six per cent. $H_2SO_4$.) Heat the mixture to a temperature of about from 80° to 100° centigrade. Take tests from time to time and continue heating until a test portion is readily soluble in hot water. Then allow the melt to cool and pour it into water. Add a little common salt, which will be sufficient to precipitate the coloring-matter. Filter, press, and dry.

My new coloring-matters possess a chocolate-brown appearance. They are readily soluble in hot water, giving red solutions. The addition of sodium carbonate or caustic soda to the aqueous solution does not change its color.

The coloring-matter dissolves in alcohol and in warm anilin, giving a cherry-red solution.

In concentrated sulfuric acid this specific coloring-matter yields a dirty-brown solution.

Now what I claim is—

1. The violet-red coloring-matter which can be obtained from di-alphyl-di-amido-anthraquinone by treatment with concentrated sulfuric acid at a temperature below 100°, which is readily soluble in hot water, but can be readily precipitated from its solutions by common salt, and whose aqueous solution is red and remains unchanged in color by the addition of sodium carbonate or caustic soda, and which is soluble in alcohol and in warm aniline, all substantially as described.

2. The new violet-red coloring-matter which can be obtained from 1.5-di-anilido-anthraquinone by treatment with concentrated sulfuric acid, at a temperature below 100°, which is readily soluble in hot water giving a red solution, which is unchanged in color by the addition of sodium carbonate or caustic soda, but from which it can be readily precipitated by common salt, and which is soluble in alcohol and warm anilin giving cherry-red solutions, and which gives dirty-brown solutions in concentrated sulfuric acid, all substantially as described.

In testimony whereof I have hereunto set my hand in the presence of two subscribing witnesses.

OSCAR BALLY.

Witnesses:
GUSTAV L. LUTTENBERGER,
GEORG KOERNER.